United States Patent
Coakley (10) Patent No.: US 10,710,177 B2
(45) Date of Patent: Jul. 14, 2020

(54) COUPLING MEMBERS FOR PIPE MACHINING APPARATUSES

(71) Applicant: Illinois Tool Works Inc., Glenview, IL (US)

(72) Inventor: Roy C. Coakley, Northlake, IL (US)

(73) Assignee: ILLINOIS TOOL WORKS INC, Glenview, IL (US)

( * ) Notice: Subject to any disclaimer, the term of this patent is extended or adjusted under 35 U.S.C. 154(b) by 615 days.

(21) Appl. No.: 13/796,121

(22) Filed: Mar. 12, 2013

(65) Prior Publication Data

US 2014/0096398 A1   Apr. 10, 2014

Related U.S. Application Data

(60) Provisional application No. 61/709,571, filed on Oct. 4, 2012.

(51) Int. Cl.
   *B23D 21/04*   (2006.01)
   *B23B 5/16*    (2006.01)
   (Continued)

(52) U.S. Cl.
   CPC ............... *B23D 21/04* (2013.01); *B23B 3/26* (2013.01); *B23B 5/163* (2013.01); *B23P 19/00* (2013.01);
   (Continued)

(58) Field of Classification Search
   CPC .............................. B23D 21/04; B23Q 9/0021
   (Continued)

(56) References Cited

U.S. PATENT DOCUMENTS

| | | |
|---|---|---|
| 1,140,208 A | 5/1915 | Taylor |
| 1,886,082 A | 11/1932 | Chapman |

(Continued)

FOREIGN PATENT DOCUMENTS

| | | |
|---|---|---|
| CN | 85102879 A | 1/1986 |
| CN | 87101953 A | 9/1988 |

(Continued)

OTHER PUBLICATIONS

HST2121, "H&S Tool Clamshell.mpg," Dec. 22, 2009, Published on YouTube, https://www.youtube.com/watch?v=Okfh-0DTj-8.*

(Continued)

*Primary Examiner* — Kenneth E Peterson
*Assistant Examiner* — Liang Dong
(74) *Attorney, Agent, or Firm* — Klintworth & Rozenblatt IP LLP (57) ABSTRACT

Pipe machining apparatuses, coupling members, and methods of assembling pipe machining apparatuses are provided. In one aspect, a coupling member for coupling together a first section and a second section of a pipe machining apparatus includes a first housing member adapted to couple to the first section, a second housing member adapted to couple to the second section, an arm movably coupled to the first housing member, and an engagement member coupled to the arm. The arm is adapted to move between a coupled condition, in which the engagement member engages the second housing member, and an uncoupled condition, in which the engagement member does not engage the second housing member.

22 Claims, 9 Drawing Sheets

(51) Int. Cl.
   *B23B 3/26* (2006.01)
   *B23Q 9/00* (2006.01)
   *B23Q 9/02* (2006.01)
   *B23P 19/00* (2006.01)

(52) U.S. Cl.
   CPC ......... *B23Q 9/0021* (2013.01); *B23Q 9/0057* (2013.01); *B23Q 9/02* (2013.01); *Y10T 29/49826* (2015.01)

(58) Field of Classification Search
   USPC .................................................. 30/93–97
   See application file for complete search history.

(56) References Cited

U.S. PATENT DOCUMENTS

| | | | |
|---|---|---|---|
| 2,358,741 A | 9/1944 | Shelby | |
| 2,364,963 A | 12/1944 | Elliott | |
| 2,635,270 A * | 4/1953 | Dawson | B23Q 9/0021 15/104.04 |
| 2,798,390 A * | 7/1957 | Bennett | B21H 7/14 30/94 |
| 2,911,239 A * | 11/1959 | Marzolf, Sr. | F16L 23/0283 285/368 |
| 2,931,659 A | 4/1960 | Novkov | |
| 2,968,375 A | 1/1961 | Avery, Sr. | |
| 3,253,336 A | 5/1966 | Brown | |
| 3,431,646 A | 3/1969 | Young | |
| 3,732,758 A | 5/1973 | Rinaldo | |
| 3,942,248 A | 3/1976 | Sherer | |
| 4,112,794 A | 9/1978 | Franks | |
| 4,289,430 A | 9/1981 | Shashaty | |
| 4,318,391 A | 3/1982 | Wachs et al. | |
| 4,366,994 A | 1/1983 | Yoshioka | |
| 4,397,487 A | 8/1983 | Guttman | |
| 4,411,178 A | 10/1983 | Wachs | |
| 4,421,441 A | 12/1983 | Hirose | |
| 4,483,223 A | 11/1984 | Nall et al. | |
| 4,490,909 A | 1/1985 | Wachs et al. | |
| 4,493,150 A | 1/1985 | Garcia | |
| 4,543,861 A | 10/1985 | Kwech et al. | |
| 4,608,755 A | 9/1986 | Braasch | |
| 4,637,285 A | 1/1987 | Mizoguchi | |
| 4,655,108 A | 4/1987 | Galos | |
| 4,677,884 A | 7/1987 | Kwech et al. | |
| 4,739,685 A | 4/1988 | Ricci | |
| 4,754,672 A | 7/1988 | VanderPol | |
| 4,762,038 A | 8/1988 | Olson | |
| 4,770,074 A | 9/1988 | Kwech | |
| 4,791,842 A | 12/1988 | Olson | |
| 4,813,314 A | 3/1989 | Kwech | |
| 4,829,860 A | 5/1989 | VanderPol | |
| 4,880,340 A | 11/1989 | Taki et al. | |
| 4,939,964 A | 7/1990 | Ricci | |
| 5,002,440 A | 3/1991 | Tamaoki et al. | |
| 5,013,015 A | 5/1991 | Fatheree | |
| 5,050,291 A | 9/1991 | Gilmore | |
| 5,054,342 A | 10/1991 | Swiatowy et al. | |
| 5,070,600 A | 12/1991 | Brew et al. | |
| 5,199,928 A | 6/1993 | Gress et al. | |
| 5,361,659 A | 11/1994 | Hanson | |
| 5,368,399 A | 11/1994 | Tremblay | |
| 5,549,024 A | 8/1996 | Ricci | |
| 5,603,250 A | 2/1997 | Robinson | |
| 5,609,081 A | 3/1997 | Lin | |
| 5,775,188 A | 7/1998 | Strait | |
| 5,875,699 A * | 3/1999 | Koelsch | B26D 7/2628 76/107.8 |
| 5,894,772 A | 4/1999 | Nodar | |
| 5,941,145 A | 8/1999 | Marshall | |
| 5,943,927 A | 8/1999 | Hanson | |
| 5,954,462 A | 9/1999 | Way et al. | |
| 6,065,378 A | 5/2000 | Ricci | |
| 6,227,577 B1 * | 5/2001 | Ikeda | F16L 17/04 285/112 |
| 6,257,110 B1 | 7/2001 | Ricci et al. | |
| 6,615,696 B2 | 9/2003 | Ricci | |
| 7,000,510 B1 | 2/2006 | Place | |
| 7,383,758 B2 | 6/2008 | Place | |
| 7,793,574 B2 | 9/2010 | Sorensen | |
| 8,534,170 B2 | 9/2013 | Arnemann | |
| 9,050,669 B2 | 6/2015 | Coakley | |
| 2004/0035171 A1 | 2/2004 | Gormany | |
| 2004/0234352 A1 | 11/2004 | Vanderpol | |
| 2005/0132851 A1 | 6/2005 | Place | |
| 2006/0207395 A1 | 9/2006 | Place et al. | |
| 2009/0191040 A1 | 7/2009 | Liu et al. | |
| 2010/0062887 A1 | 3/2010 | Bodensteiner et al. | |
| 2010/0162860 A1 * | 7/2010 | Hall | B23B 3/26 82/113 |
| 2011/0219920 A1 | 9/2011 | Arnemann et al. | |
| 2014/0190327 A1 | 7/2014 | Pierce | |

FOREIGN PATENT DOCUMENTS

| | | |
|---|---|---|
| CN | 2109276 U | 7/1992 |
| CN | 2254385 Y | 5/1997 |
| CN | 2274107 Y | 2/1998 |
| CN | 1424155 A | 6/2003 |
| CN | 2761329 Y | 3/2006 |
| CN | 201482987 U | 5/2010 |
| DE | 900042 C | 12/1953 |
| DE | 2439852 A | 4/1976 |
| DE | 3603618 C1 | 10/1987 |
| DE | 4240637 C1 | 6/1994 |
| DE | 10020393 A1 | 2/2001 |
| DE | 10 2009 005983 A1 | 7/2010 |
| EP | 0733425 A2 | 9/1996 |
| EP | 0819501 A1 | 1/1998 |
| FR | 2641487 | 7/1990 |
| GB | 2242850 A | 10/1991 |
| WO | 2010077349 A1 | 7/2010 |
| WO | 2012/071419 A1 | 5/2012 |
| WO | 2014055610 A1 | 4/2014 |
| WO | 2014/109910 | 7/2014 |

OTHER PUBLICATIONS

International Search Report and Written Opinion for PCT/US2013/063007, dated Jan. 22, 2014, 14 pages.
International Search Report and Written Opinion for PCT/US2013/062999 dated Jan. 29, 2014, 12 pages.
International Search Report and Written Opinion for PCT/US2013/062987 dated Feb. 20, 2014, 11 pages.
International Search Report and Written Opinion for International Patent Application No. PCT/US2013/063023 dated Jun. 2, 2014, 16 pages.
International Search Report for PCT/US2014/058814, dated Dec. 15, 2014.
International Search Report and Written Opinion for PCT/US2015/056015 dated Mar. 31, 2016, 19 pages.
International Search Report and Written Opinion for PCT/US2015/056006 dated Mar. 31, 2016, 17 pages.
Communication pursuant to Rule 164(2)(b) and Article 94(3) EPC issued for EP 13 779 984.7-1019 dated Jan. 16, 2018, 6 pages.

* cited by examiner

COUPLING MEMBERS FOR PIPE MACHINING APPARATUSES

RELATED APPLICATIONS

The present application claims the benefit of U.S. Provisional Patent Application No. 61/709,571, filed Oct. 4, 2012, the entire contents of which is incorporated herein by reference.

FIELD OF THE INVENTION

The present disclosure generally relates to pipe machining apparatuses and, more particularly, to pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are coupled together around the pipe. Such a pipe cutter includes a tool or cutting device that encircles the pipe and moves toward the pipe in small increments during the cutting process in order to slowly cut into the pipe. Eventually, after many small increments of adjustment toward the pipe, the pipe will be completely cut.

The frame halves of a split frame pipe machining apparatus are generally semi-circular in shape and each frame half includes two split line mating surfaces. The split line mating surfaces of the two halves come together and engage each other when the two halves are coupled together. Dowel pins project from one of the split line mating surfaces on each side of the halves and associated dowel holes are defined in the other of the split line mating surfaces on each side of the halves. The dowel pins are received in the dowel holes to properly align the two frame halves prior to coupling the two halves together. In order for the dowel pins to be received in the dowel holes, the pins must first be aligned with the holes, then moved into the holes. Since numerous dowel pins are included on both sides of the halves, alignment of numerous pin-and-hole pairings must be achieved before the pins can be moved into the holes. Aligning numerous pin-and-hole pairings can be a cumbersome task. Moreover, binding can occur if the dowel pins are not properly aligned with the dowel holes, thereby making assembly and disassembly of the two frame halves difficult. Furthermore, a high degree of machining accuracy is required when forming the split line mating surfaces. That is, the split line matting surfaces must be parallel to a rotational axis of the pipe machining apparatus to ensure proper mating and coupling.

SUMMARY

The present disclosure is defined by the following claims, and nothing in this section should be taken as a limitation on those claims.

In one aspect, a pipe machining apparatus is provided and includes a first section including a first portion of a frame and a first portion of a tool carrier, and a second section including a second portion of the frame and a second portion of the tool carrier. The first section and the second section are adapted to be coupled together around a pipe, and, with the first and second sections coupled together, the frame is fixed relative to the pipe and the tool carrier is adapted to move relative to the frame and the pipe. The pipe machining apparatus also includes a coupling member adapted to couple the first section and the second section together. The coupling member includes a first housing member coupled to the first section, a second housing member coupled to the second section, an arm movably coupled to the first housing member, and an engagement member coupled to the arm. The arm is adapted to move between a coupled condition, in which the engagement member engages the second housing member, and an uncoupled condition, in which the engagement member does not engage the second housing member.

In another aspect, a coupling member for coupling together a first section and a second section of a pipe machining apparatus is provided. The coupling member includes a first housing member adapted to couple to the first section, a second housing member adapted to couple to the second section, an arm movably coupled to the first housing member, and an engagement member coupled to the arm. The arm is adapted to move between a coupled condition, in which the engagement member engages the second housing member, and an uncoupled condition, in which the engagement member does not engage the second housing member.

In a further aspect, a method of assembling a pipe machining apparatus including a first section and a second section is provided. The method includes moving the first section toward the second section and engaging a first housing member of a coupling member with a second housing member of the coupling member. The first housing member is coupled to the first section and the second housing member is coupled to the second section. The method also includes moving an arm coupled to the first housing member to a coupled condition, in which an engagement member of the arm engages the second housing member, from an uncoupled condition, in which the engagement member does not engage the second housing member.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
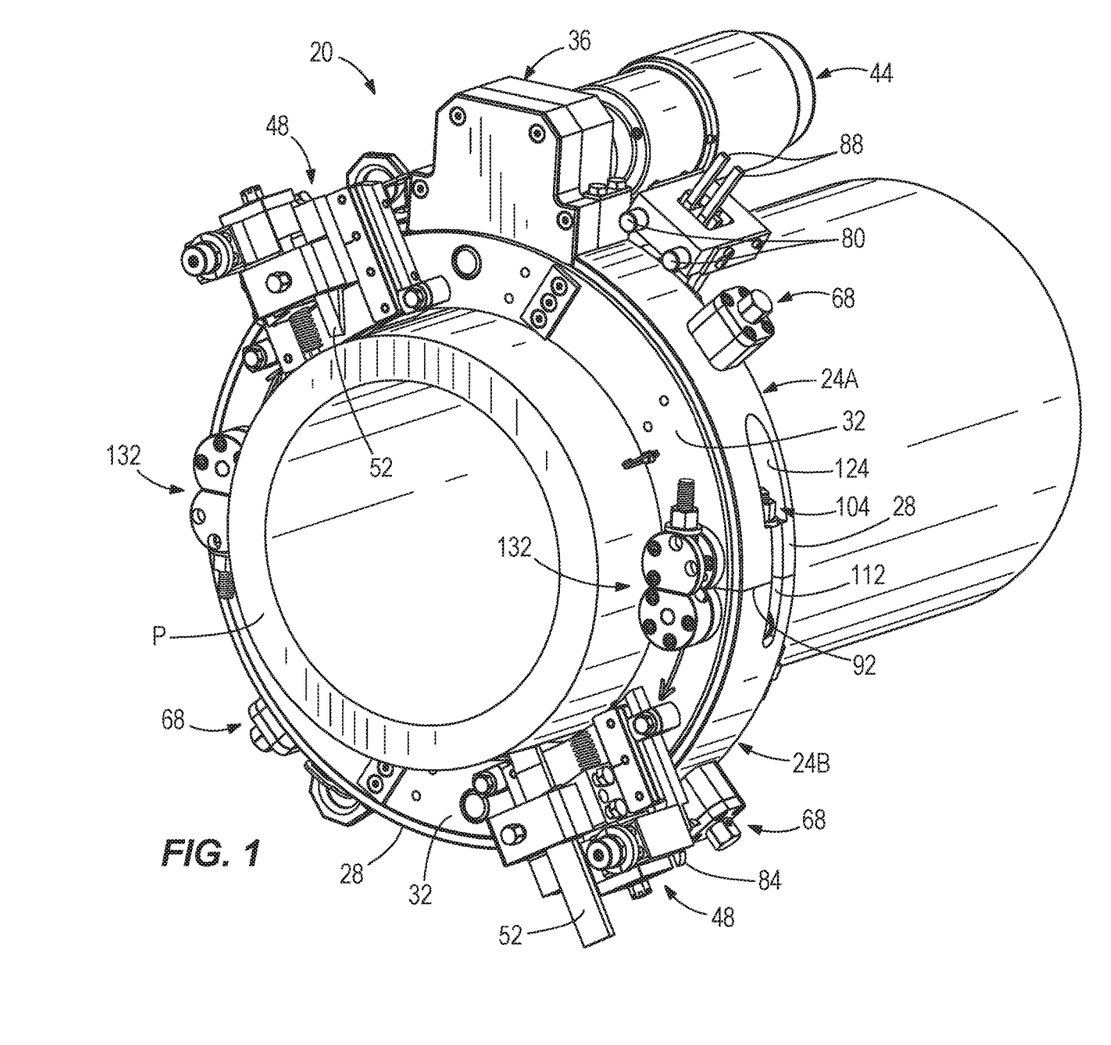
FIG. 1 is a top front perspective view of an exemplary pipe machining apparatus coupled to a pipe, the pipe machining apparatus is shown with a pair of exemplary coupling members in a coupled condition, in accordance with one embodiment.
Figure 2:
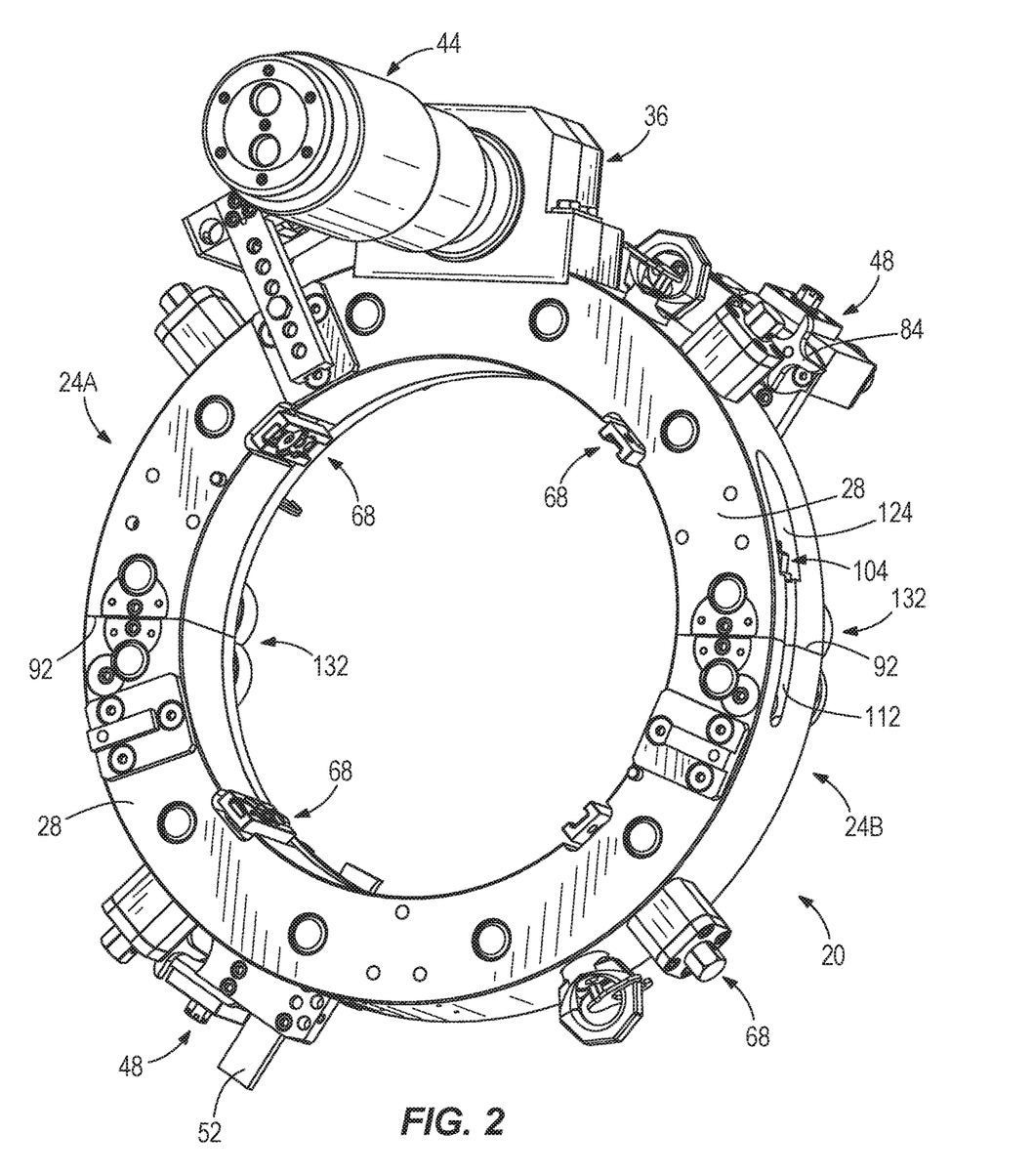
FIG. 2 is a bottom rear perspective view of the pipe machining apparatus illustrated in FIG. 1, in accordance with one embodiment.
Figure 3:
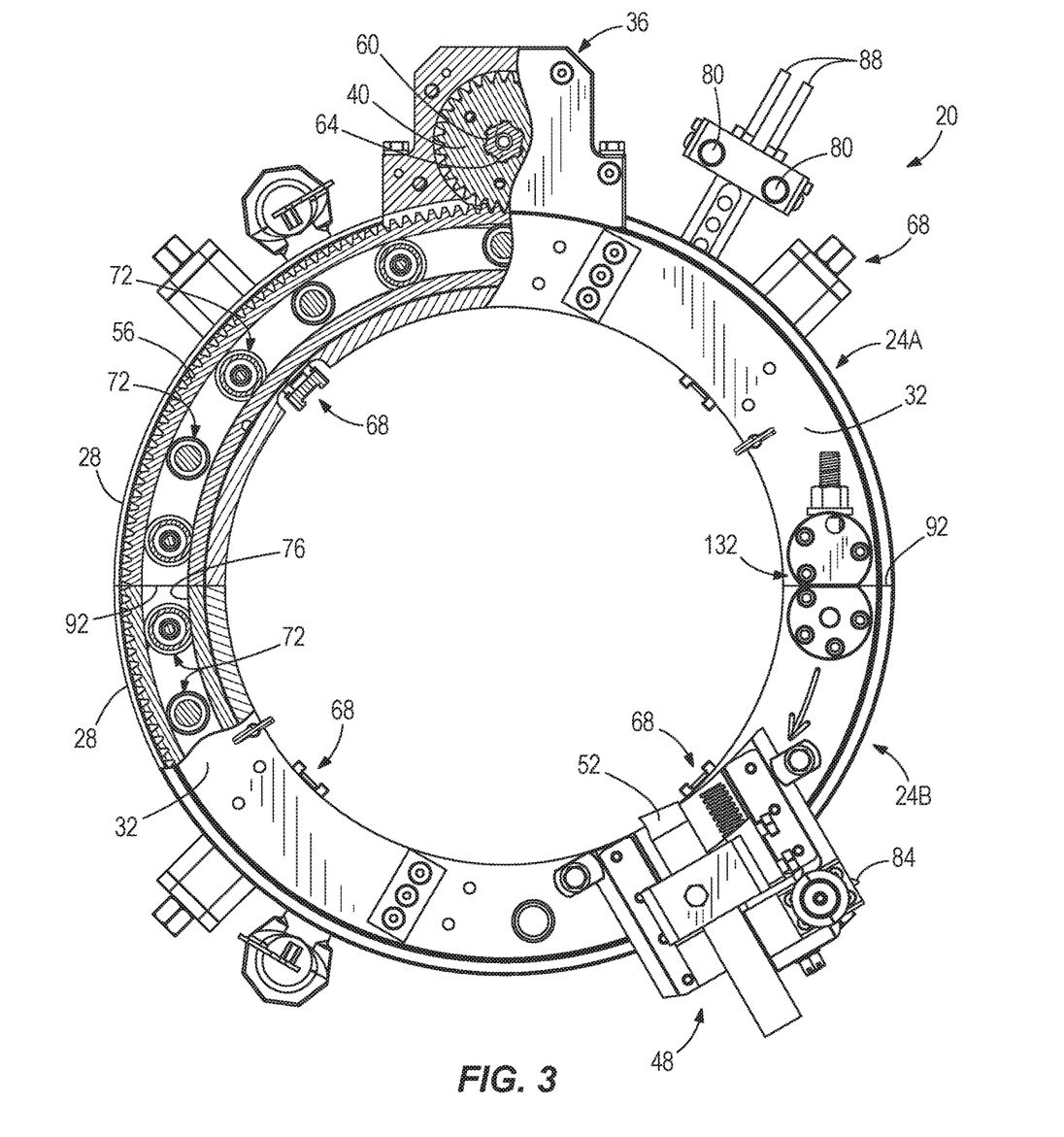
FIG. 3 is a front view of the pipe machining apparatus illustrated in FIG. 1 with a portion thereof broken away to show internal components of the pipe machining apparatus, and one of the coupling members illustrated in FIG. 1 is shown in a coupled condition, in accordance with one embodiment.

With reference to FIGS. 1-3, there is shown one exemplary embodiment of a pipe machining apparatus 20 adapted to machine pipes P of varying diameters. In some exemplary embodiments, the apparatus 20 completely cuts through pipes P. In other exemplary embodiments, the apparatus 20 prepares an end of a pipe P for coupling to another pipe. In still other exemplary embodiments, the apparatus 20 both completely cuts and prepares a pipe P for coupling to another pipe.

In the illustrated exemplary embodiment, pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 is included in one section 24A and a second portion of the frame 28 and a second portion of the tool carrier 32 is included in the other section 24B. The frame 28 has a column 36 extending outwardly of the two semicircular sections 24A, 24B and houses a pinion gear 40 adapted to couple with a suitable drive motor 44, such as an air motor with suitable gear reduction means. The frame 28 is adapted to couple and be fixed relative to a pipe P, and the tool carrier 32 is rotatable relative to the fixed frame 28 and the pipe P. The air motor 44 is adapted to rotate the tool carrier 32 relative to the frame 28 through a gear train in the column 36. The tool carrier 32 has a circular gear rack 56 for meshing with the pinion gear 40 rotatably mounted in column 36. The pinion gear 40 has an opening 60 provided with a polygonal perimeter for receiving a complementary shaped drive head 64 of drive motor 44. Therefore, it can be seen that drive motor 44 is adapted to rotate tool carrier 32 relative to the frame 28 through a gear train provided by pinion gear 40 in column 36 and circular gear rack 56 on the tool carrier 32.

The rotatable tool carrier 32 includes one or more tool supports 48 (two tool supports shown in the illustrated exemplary embodiment), which support tools 52 for performing a cutting or machining operation on the pipe P as the tools 52 rotate circumferentially about the pipe P. The machining operation performed by the tool(s) 52 may form a straight edge perpendicular to a longitudinal extent of the pipe P, a bevel on an end of the pipe P that is transverse to the longitudinal extent of the pipe P and at an angle other than ninety degrees, or an edge of a pipe P having any angle relative to the longitudinal extent of the pipe P.

The apparatus 20 further includes four adjustable clamp members or coupling members 68 engageable with an exterior of the pipe P and having suitable adjustability to couple and concentrically locate the apparatus 20 to the pipe P.

As best seen in FIG. 3, tool carrier 32 is rotatably mounted on and supported by frame 28 by a plurality of roller bearings 72. The roller bearings 72 ride in a circular bearing race 76 defined in the interior of tool carrier 32.

A plurality of projections 80 are adjustably movable into and out of a path of an advancement member 84 coupled to each tool support 48 to advance the tool 52 toward the pipe P. In the illustrated exemplary embodiment, the apparatus 20 includes a total of two projections 80 for engaging the advancement members 84, however, the apparatus 20 may have any number of projections 80. Each projection 80 is coupled to a lever 88 that may be actuated by a user to selectively move the projection 80 into and out of the path of the advancement members 84.

Figure 4:
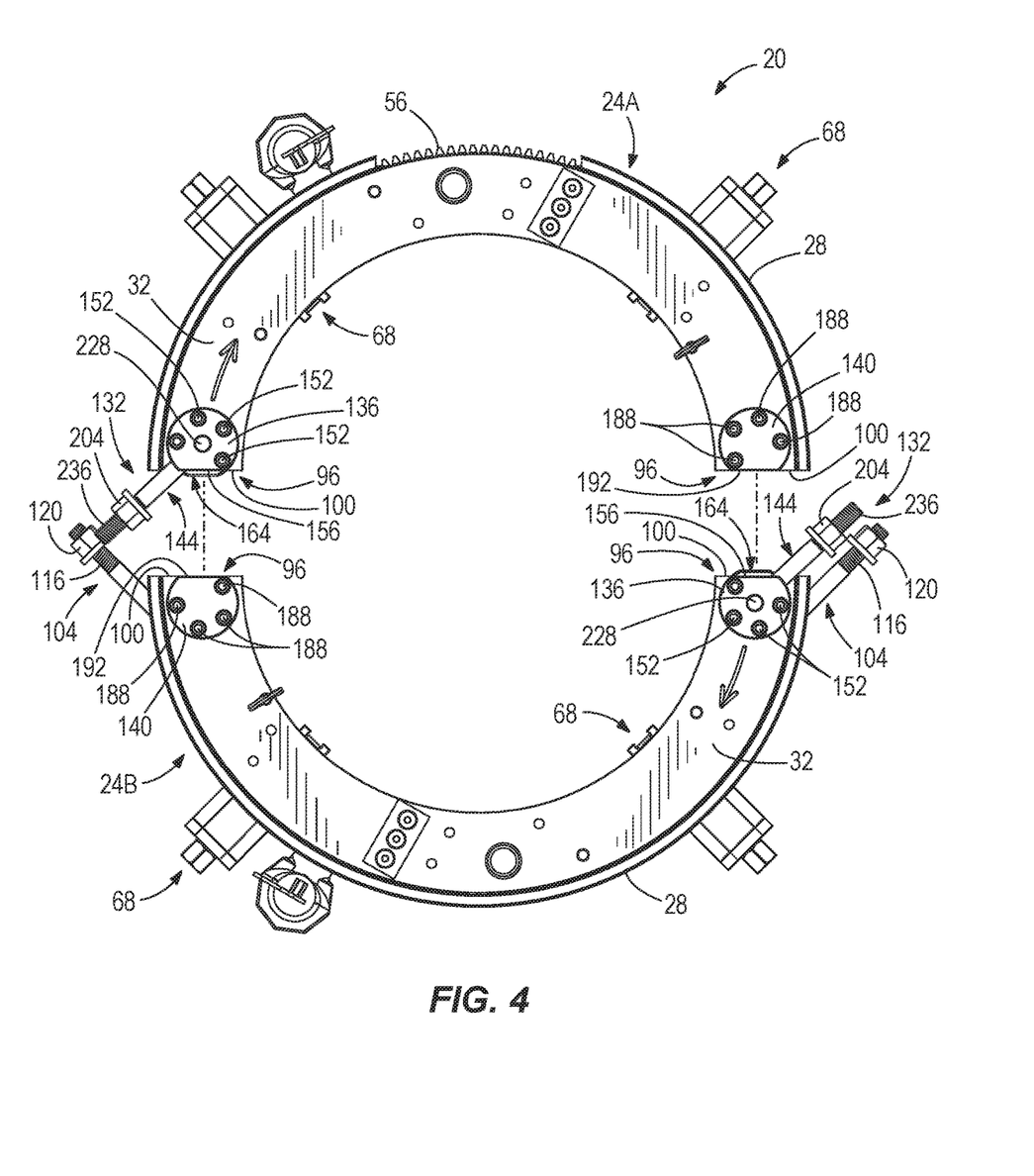
FIG. 4 is a front view of the pipe machining apparatus illustrated in FIG. 1 with two sections of the pipe machining apparatus disassembled from one another and the pair of exemplary coupling members in an uncoupled condition, in accordance with one embodiment.

With continued reference to FIGS. 1-3 and additional reference to FIG. 4, the apparatus 20 includes a split line 92 where the two sections 24A, 24B separate and come together. Each section 24A, 24B includes two ends 96 with each end of the tool carrier 32 including a mating surface 100. When the apparatus 20 is assembled as shown in FIG. 3, mating surfaces 100 on corresponding ends 96 of tool carrier 32 of the sections 24A, 24B may engage each other and the two sections 24A, 24B may be coupled together.

The apparatus 20 includes a pair of first coupling members 104, one on each side of the apparatus 20, that are inline with and coupled to the frame 28. Each of the first coupling members 104 includes a first end 108 pivotally coupled to sections 24B of the frame 28 in a recess 112 and a second threaded end 116 including an adjustable engagement member 120 that may be threaded along the threaded end 116. A second recess 124 is defined in both sides of section 24A of the frame 28 and each second recess 124 is adapted to receive the engagement member 120 of the corresponding first coupling member 104. The second recess 124 defines a seat 128 adapted to receive the engagement member 120 and assist with retaining the engagement member 120 in the second recess 124.

Figure 5:
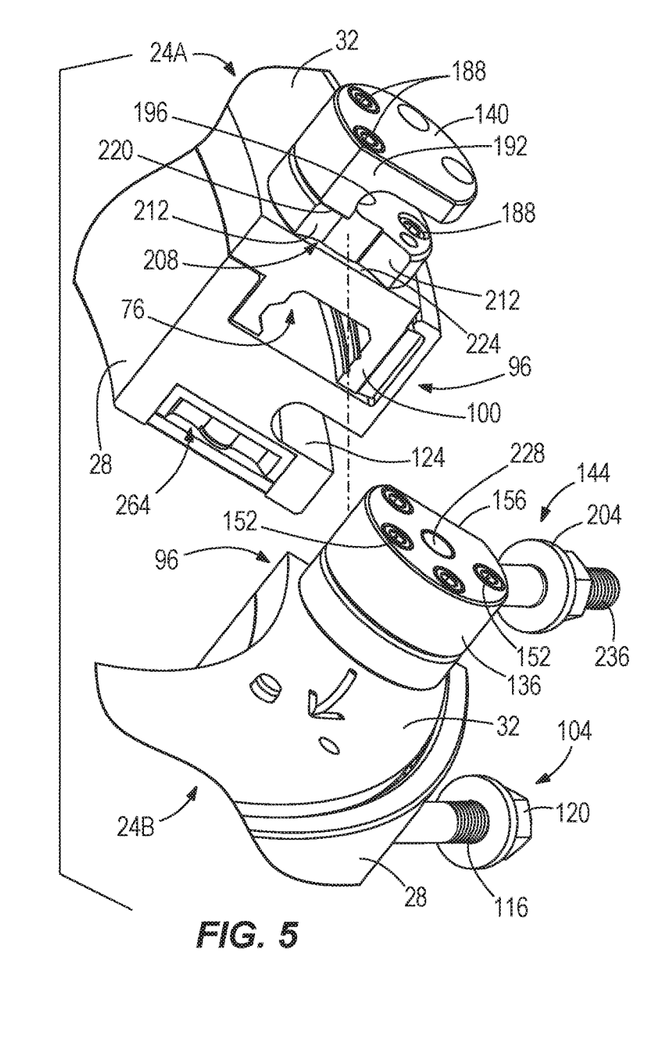
FIG. 5 is a bottom perspective view of a portion of the pipe machining apparatus shown in FIG. 1 with the two sections of the pipe machining apparatus disassembled and one of the coupling members shown in an uncoupled condition, in accordance with one embodiment.
Figure 6:
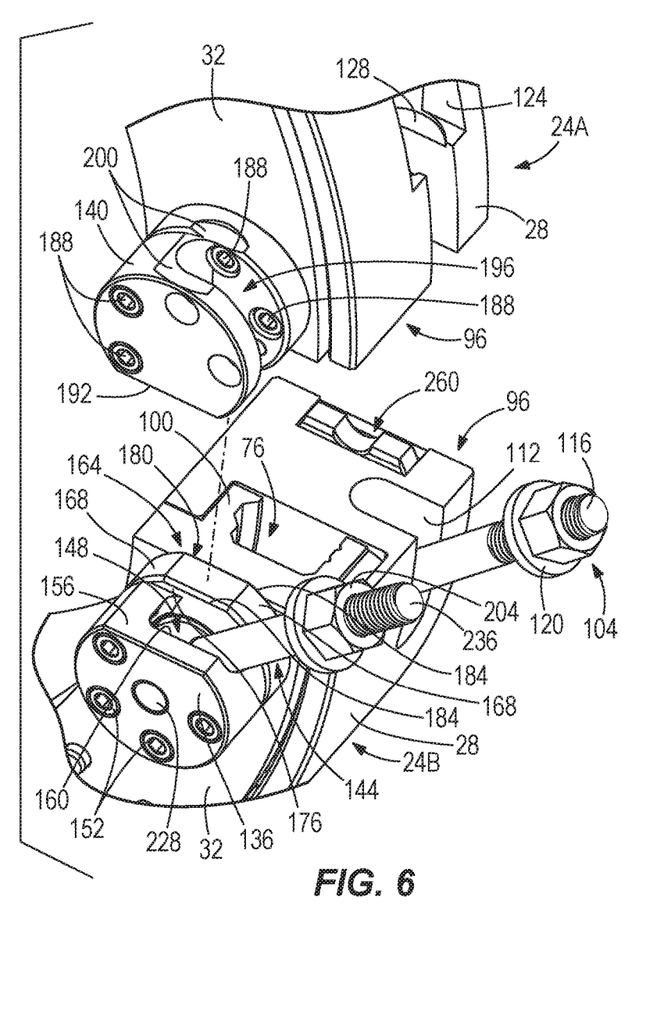
FIG. 6 is a top perspective view of a portion of the pipe machining apparatus shown in FIG. 1 with the two sections of the pipe machining apparatus disassembled and one of the coupling members shown in an uncoupled condition, in accordance with one embodiment.
Figure 7:
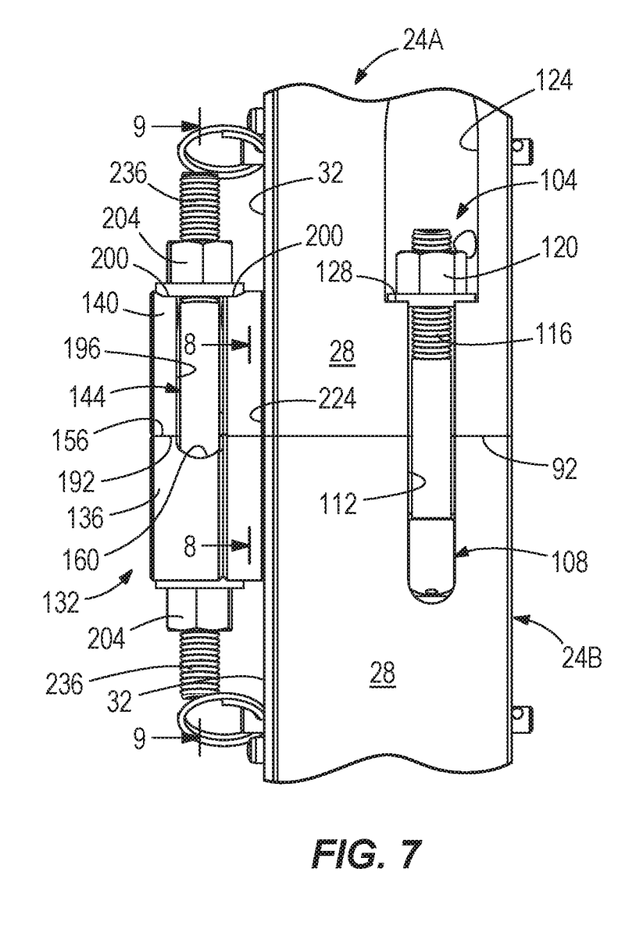
FIG. 7 is a left side view of the pipe machining apparatus shown in FIG. 1 with the two sections of the pipe machining apparatus assembled and one of the coupling members shown in a coupled condition, in accordance with one embodiment.

With reference to FIGS. 1, 2, and 7, one of the first coupling members 104 is illustrated in a coupled condition, in which the engagement member 120 is positioned in the seat 128 of the second recess 124 and tightened down to assist in securing sections 24A, 24B together. To move the first coupling member 104 to the uncoupled condition illustrated in FIGS. 4-6, the engagement member 120 is threadably loosened along the threaded end 116 of the first coupling member 104 to move the engagement member 120 out of the seat 128, and the first coupling member 104 is rotated about its first end 108 until the engagement member 120 is completely out of the second recess 124. The first recess 112 is shaped to facilitate swinging and rotating of the first end 108 of the first coupling member 104. Moreover, the first recess 112 can be shaped to control the extent to which the first coupling member 104 rotates toward the uncoupled condition as illustrated in FIGS. 4-6. The pair of first coupling members 104 may be swung between coupled and uncoupled conditions as desired by a user to respectively couple and uncouple the two sections 24A, 24B of the apparatus 20.

Referring now to FIGS. 1 and 3-8, the apparatus 20 further includes a pair of second coupling members 132, one on each side of the apparatus 20, that are coupled to the tool carrier 32. Thus, the pair of second coupling members 132 rotate with the tool carrier 32 relative to the frame 28 during operation of the apparatus 20. The pair of second coupling members 132 are substantially identical in structure and function. Thus, only one of the second coupling members 132 will be described herein in detail. However, the description presented herein pertaining to one of the second coupling members 132 applies similarly to both second coupling members 132.

With continued reference to FIGS. 1 and 3-8, each second coupling member 132 includes a first housing member 136 coupled to the tool carrier 32 on a respective section 24A, 24B of the apparatus 20, a second housing member 140 coupled to the tool carrier 32 on the other of the sections 24A, 24B, and an arm 144 rotatably coupled at a first end 148 thereof to the first housing member 136.

The first housing member 136 couples to the tool carrier 32 with a plurality of fasteners 152. The first housing member 136 of one of the second coupling members 132 is coupled to the tool carrier 32 included in section 24B of the apparatus 20 and the first housing member 136 of the other of the second coupling members 132 is coupled to the tool carrier 32 included in section 24A of the apparatus 20. The orientation of the first housing member 136 may be adjusted by loosening the fasteners 152, rotating or otherwise moving the first housing member 136, then tightening the fasteners 152 to secure the first housing member 136 to the tool carrier 32. The first housing member 136 includes a mating surface 156 that is substantially flat and defines a recess 160 allowing rotation of the arm 144 and controlling the extent to which the arm 144 can rotate toward the uncoupled condition. The first housing member 136 also includes a projection 164 extending beyond the flat mating surface 156 of the first housing member 136 and beyond the mating surface 100 of the respective end 96 of the tool carrier 32. The projection 164 includes arcuate side surfaces 168 and flat opposing front and rear surfaces 176, 180. A chamfer or bevel 184 may be defined on edges of the projection 164.

The second housing member 140 couples to the tool carrier 32 with a plurality of fasteners 188. The second housing member 140 of one of the second coupling members 132 is coupled to the tool carrier 32 included in section 24A of the apparatus 20 and the second housing member 140 of the other of the second coupling members 132 is coupled to the tool carrier 32 included in section 24B of the apparatus 20. The orientation of the second housing member 140 may be fixed by a dowel pin 216 in combination with fasteners 188. The second housing member 140 includes a mating surface 192 that is substantially flat and defines a recess 196 therein allowing rotation of the arm 144 and controlling the extent to which the arm 144 can rotate toward a coupled condition. A seat 200 is defined in the second housing member 140 for receiving an engagement member 204 of the arm 144 and assists with maintaining the arm 144 in the coupled condition. The seat 200 is generally flat and is disposed on both sides of the recess 196. The second housing member 140 also defines a receptacle 208 therein for receiving the projection 164 of the first housing member 136. The receptacle 208 is defined by a pair of arcuate surfaces 212, a protrusion 220 on the second housing member 140 defining one side of the receptacle 208, and a surface 224 of the tool carrier 32 defining an opposing side of the receptacle 208.

Figure 8:
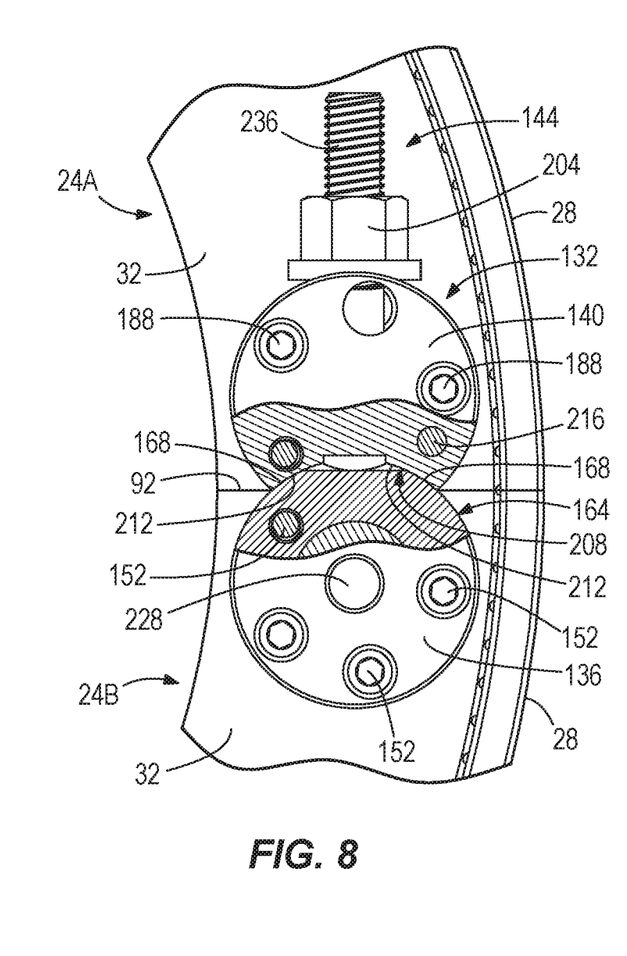
FIG. 8 is an enlarged front view of the pipe machining apparatus shown in FIG. 1 with a portion thereof broken away in accordance with reference line 8-8 in FIG. 7 to illustrate internal components of one of the coupling members in a coupled condition, in accordance with one embodiment.
Figure 9:
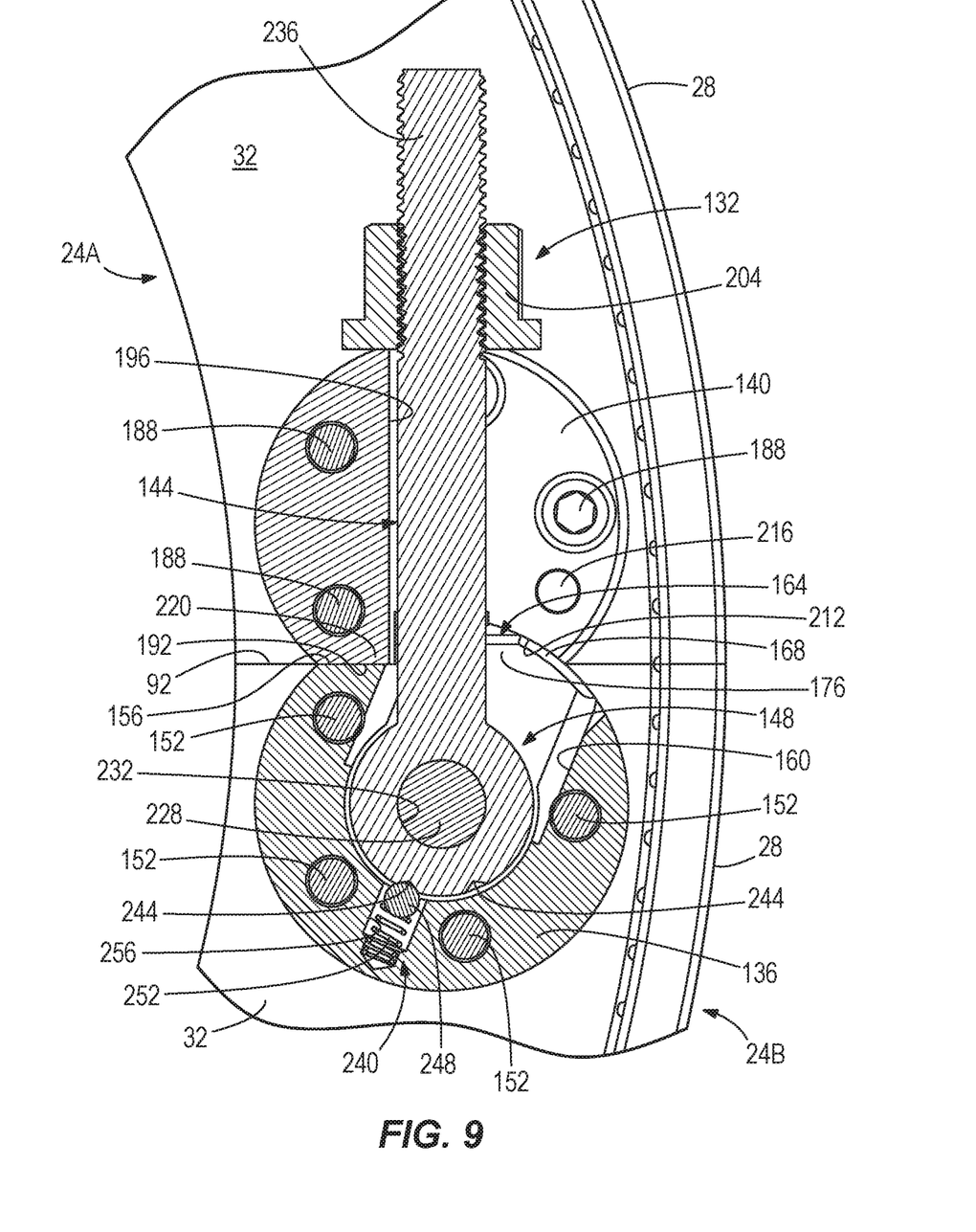
FIG. 9 is a cross-sectional view taken along line 9-9 in FIG. 7 to show an exemplary detent mechanism of one of the coupling members, in accordance with one embodiment.
Figure 10:
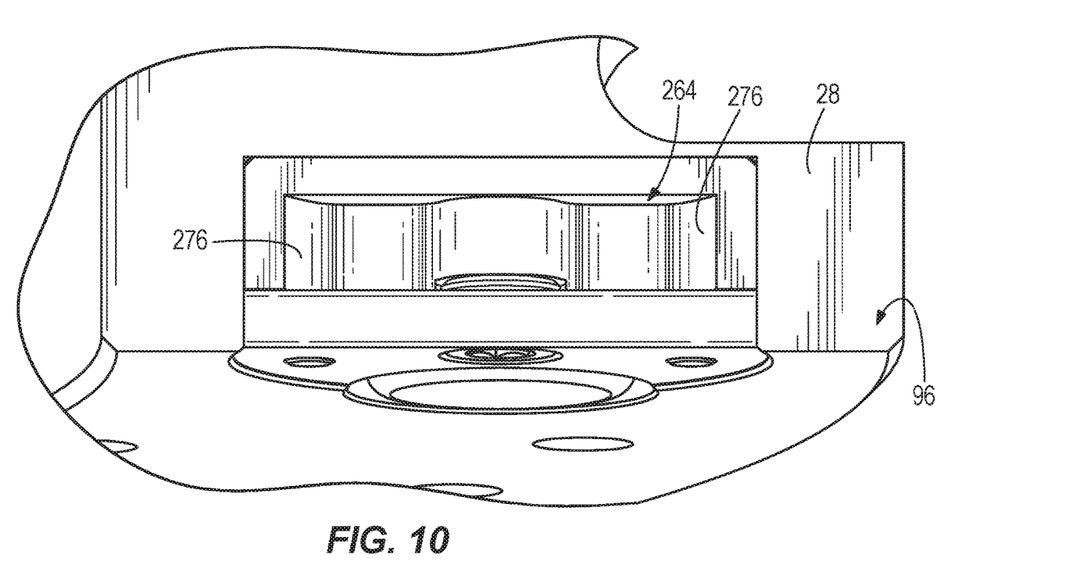
FIG. 10 is a perspective view of an end of one of the split frame sections of the pipe machining apparatus shown in FIG. 1 with an exemplary alignment receptacle, in accordance with one embodiment.
Figure 11:
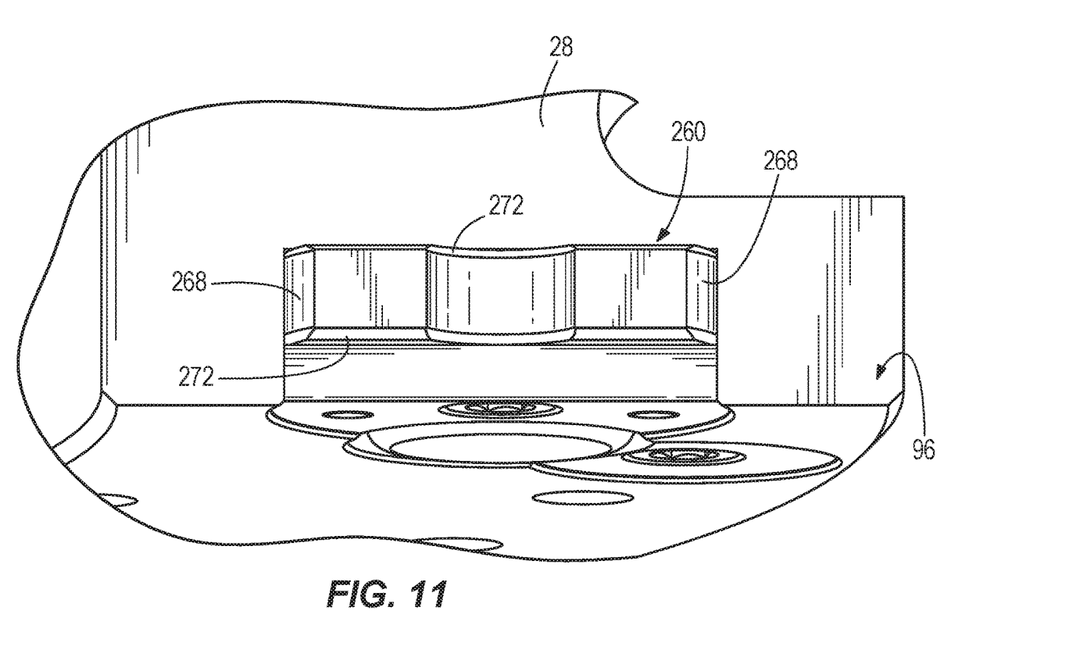
FIG. 11 is a perspective view of an end of one of the split frame sections of the pipe machining apparatus shown in FIG. 1 with an exemplary alignment projection, in accordance with one embodiment.

With further reference to FIGS. 1 and 3-8, and additional reference to FIG. 9, the arm 144 is rotatably coupled at one end to a shaft 228, which is coupled to the first housing member 136. The arm 144 includes an aperture 232 therethrough for receiving the shaft 228. The arm 144 also includes an opposing threaded end 236 and the engagement member 204 threadably movable along the threaded end 236.

The second coupling member 132 further includes a detent mechanism 240 (see FIG. 9) for selectively retaining the arm 144 in the coupled condition and the uncoupled condition. The detent mechanism 240 comprises a pair of spaced-apart indentations 244 defined in one end of the arm 144, a retaining member 248, and a biasing member 252. The biasing member 252 is disposed in a cavity 256 defined in the first housing member 136 and engages the retaining member 248 to bias the retaining member 248 toward the arm 144. With reference to FIG. 9, the second coupling member 132 is shown in the coupled condition and the retaining member 248 is biased into one of the indentations 244 associated with the coupled condition. After loosening of the engagement member 204, the arm 144 remains in the orientation illustrated in FIG. 9 due to the detent mechanism 240. A user may apply sufficient force to the arm 144 to overcome the force applied to the arm 144 by the detent mechanism 240 and move the arm 144 toward the uncoupled condition. When the arm 144 moves into the uncoupled condition, the retaining member 248 is biased into the other indentation 244 associated with the uncoupled condition. The detent mechanism 240 maintains the arm 144 in the uncoupled condition until a user applies a sufficient force to overcome the force applied to the arm 144 by the detent mechanism 240.

The second coupling members 132 perform a variety of functions. First, the second coupling members 132 assist with guiding the two sections 24A, 24B into proper alignment with each other in preparation of coupling the two sections 24A, 24B together. Second, the second coupling members 132 provide a user with a manner of quickly and easily retaining the sections 24A, 24B together around a pipe P prior to complete and final coupling of the two sections 24A, 24B by quickly flipping the arms 144 to the coupled condition and the arms 144 being retained in the coupled condition by the detent mechanism 240. Third, the second coupling members 132, along with the first coupling members 104, assist with finally and completely coupling the two sections 24A, 24B of the apparatus 20 together. Fourth, with the use of the second coupling members 132, the mating surfaces 100 of the ends 96 of the tool carrier 32 of sections 24A, 24B do not need to be machined or manufactured to include such a high degree of tolerance. The second coupling members 132 are adapted to achieve other functions not explicitly identified herein, but apparent to those having ordinary skill in the art, and all of such functions are intended to be within the spirit and scope of the present disclosure.

Figure 12:
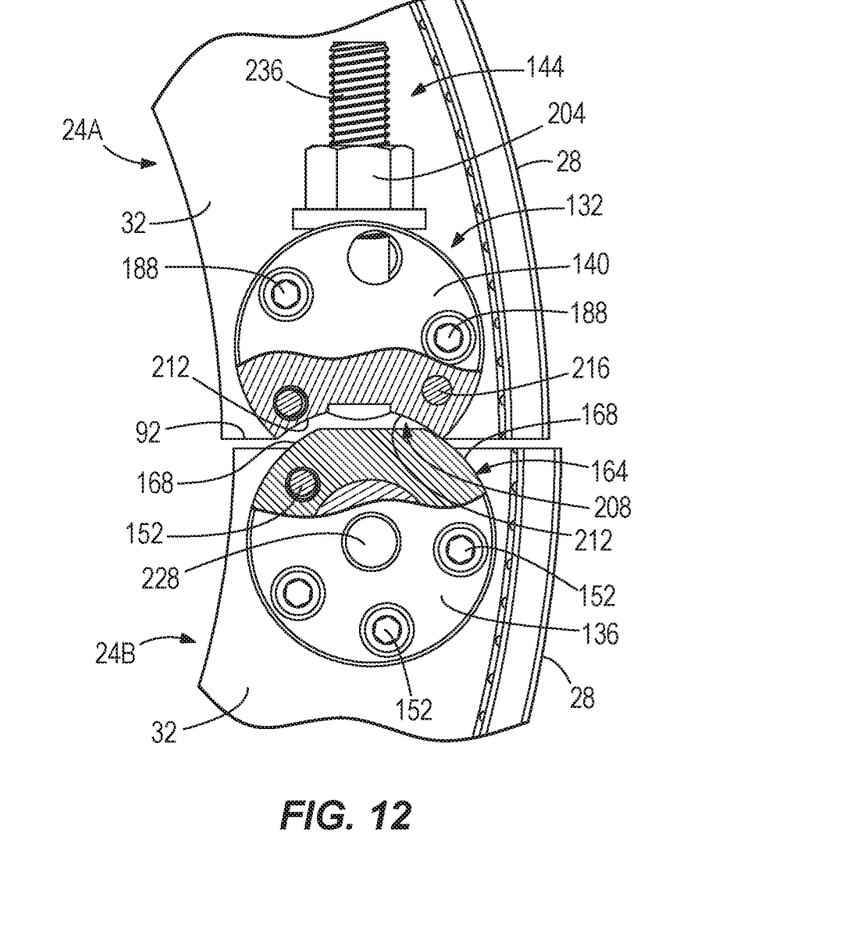
FIG. 12 is an enlarged front view of the pipe machining apparatus shown in FIG. 1 with a portion thereof broken away in accordance with reference line 8-8 in FIG. 7 to illustrate internal components of one of the coupling members, in accordance with one embodiment.

Referring now to FIG. 4, the two sections 24A, 24B of the apparatus 20 are shown in an uncoupled or disassembled condition. To assemble the two sections 24A, 24B, the ends 96 of the two sections 24A, 24B are generally aligned and moved toward one another. With additional reference to FIGS. 5 and 6, as the ends 96 of the two sections 24A, 24B draw close together, the projections 164 of the first housing members 136 begin to insert into the receptacles 208 of the second housing members 140. The chamfered edges 184 and arcuate surfaces 168 of the projections 164, along with the complementary shape of the receptacles 208, accommodate situations where the two sections 24A, 24B are not exactly properly aligned (see, e.g., FIG. 12). More particularly, the projections 164 and receptacles 208 engage each other and guide the two sections 24A, 24B into the ultimate proper alignment as the two sections 24A, 24B move together. The chamfered edges 184 and arcuate surfaces 168 of the projections 164 and the shape of the receptacles 208 generally provide a ramp engagement such that any portion of the projections 164 can engage any portion of the receptacles 208 and the projections 164 will ride along the interiors of the receptacles 208 until the projections 164 are guided into and properly seated within the receptacles 208 as illustrated in FIGS. 8 and 9.

Once the first and second housing members 136, 140 are adequately brought together, the arm 144 may be swung from the uncoupled condition illustrated in FIGS. 4-6 to the coupled condition shown in FIGS. 3 and 7-9. The retaining member 248 of the detent mechanism 240 inserts into the indentation 244 associated with the coupled condition to retain the arm 144 in the coupled condition. The engagement member 204 may then be threaded toward and into the seat 200 of the second housing member 140. The engagement member 204 is threaded until an adequate amount of tightening has been achieved. The first coupling members 104 may also be tightened to assist with securing the two sections 24A, 24B together.

When the second coupling members 132 and the two sections 24A, 24B are in the completely coupled condition (see FIGS. 7-9), the arcuate surfaces 168 of the projection 164 engage the arcuate surfaces 212 of the receptacle 208, the flat rear surface 180 of the projection 164 engages the surface 224 of the tool carrier 32, and the opposing flat front surface 176 of the projection 164 engages the protrusion 220 of the receptacle 208. Thus, the second housing member 140 has portions thereof on multiple sides (e.g., top, front, rear, left, and right) of the projection 164 of the first housing member 136, thereby inhibiting movement of the first and second housing members 136, 140 relative to each other in multiple directions (e.g., forward, rearward, upward, left, and right).

When coupling the two sections 24A, 24B of the apparatus 20 together, some portions of the two sections 24A, 24B near the ends 96 of the two sections 24A, 24B need to abut and mate to facilitate a proper coupling of the two sections 24A, 24B. In conventional split frame pipe machining apparatuses, mating surfaces at the ends of the tool carrier are the surfaces that must abut and mate in an appropriate manner in order to adequately couple the two sections together. If the mating surfaces of the tool carrier ends were not properly toleranced or if the dowel pins were not appropriately inserted into the associated holes (conventional manner of aligning ends of sections—see Background), the two sections could not be properly coupled. Ensuring that the mating surfaces of the tool carrier ends of the two sections were properly machined to an appropriate degree of tolerance or ensuring the dowel pins and associated holes were adequately aligned and inserted can be a complicated, time consuming, and costly process, and even after taking all of these necessary steps still may not result in proper coupling of the ends of the sections.

The apparatus 20 illustrated and described herein relies on the mating surfaces 156, 192 of the first and second housing members 136, 140 to abut and mate, rather than the mating surfaces 100 of the tool carrier ends 96 of the two sections 24A, 24B, to facilitate a proper coupling of the two sections 24A, 24B. The process for ensuring proper tolerancing of the mating surfaces 156, 192 of the first and second housing members 136, 140 can be easier, quicker, and less costly. Additionally, the orientation of the first housing member 136 may be adjusted relative to the fixed second housing member 140 to ensure proper mating of the mating surfaces 156, 192. By utilizing the mating surfaces 156, 192 of the first and second housing members 136, 140, the mating surfaces 100 of the tool carrier ends 96 of the two sections 24A, 24B do not need to be tolerance to such a high degree, thereby potentially saving time, effort, and money when manufacturing the apparatus 20.

Referring now to FIGS. 5, 6, 10, and 11, the apparatus 20 further includes an alignment projection 260 and an alignment receptacle 264 complimentarily shaped to receive the alignment projection 260 therein. In the illustrated exemplary embodiment, the alignment projection 260 and the alignment receptacle 264 are inserts coupled to the frame 28 in ends of the two sections 24A, 24B. In other exemplary embodiments, the alignment projection 260 and alignment receptacle 264 may be unitarily formed as one-piece with the frame 28 of the two sections 24A, 24B. Also, in embodiments where the alignment projection 260 and alignment receptacle 264 are inserts, the inserts may be made of a different material than the frame 28 such as, for example, the frame 28 may be aluminum and the inserts may be steel. Each alignment projection 260 includes two portions, with each portion including angled exterior surfaces 268 and chamfered edges 272 to provide a ramp-like member. Each alignment receptacle 264 includes two compartments, one for receiving a corresponding one of the two portions of the alignment projection 260. The compartments include angled side surfaces 276 that also act like a ramp surface. Upon coupling the two sections 24A, 24B together, the alignment projections 260 insert into the alignment receptacles 264, which may bring the angled exterior surfaces 268 of the alignment projections 260 into the angled side surfaces 276 of the receptacles 264. The ramp-like surfaces ride along each other to position the alignment projections 260 in the proper location within the alignment receptacles 264, thereby also positioning the two sections 24A, 24B in the proper position relative to one another. The alignment projections 260 and alignment receptacles 264 cooperate with the second coupling members 132 to ensure easy, quick, and proper alignment of the two sections 24A, 24B for coupling.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
   a first section including a first portion of a frame and a first portion of a tool carrier;
   a second section including a second portion of the frame and a second portion of the tool carrier, wherein the first section and the second section are adapted to be coupled together around a pipe, and, with the first and second sections coupled together, the frame is fixed relative to the pipe and the tool carrier is adapted to move relative to the frame and the pipe; and
   a coupling member adapted to couple the first section and the second section together, the coupling member including
      a first housing member coupled to the first section and including a projection having an arcuate surface,
      a second housing member coupled to the second section and defining a receptacle adapted to receive the projection of the first housing member, wherein the second housing member includes a pair of arcuate surfaces at least partially defining the receptacle,
      an arm movably coupled to the first housing member, and
      an engagement member coupled to the arm,
      wherein the arm is adapted to move between a coupled condition, in which the engagement member engages the second housing member, and an uncoupled condition, in which the engagement member does not engage the second housing member;
   wherein, during assembly of the first and second sections, the arcuate surfaces of the projection and the receptacle are adapted to engage each other with the first and second sections misaligned, allow the projection to insert into the receptacle with the first and second sections misaligned and to move the first and second sections into proper alignment for coupling together.

2. The pipe machining apparatus of claim 1, wherein the first housing member is coupled to the first portion of the tool carrier on the first section and the second housing member is coupled to the second portion of the tool carrier on the second section.

3. The pipe machining apparatus of claim 1, wherein the arm is rotatably coupled to the first housing member and is adapted to rotate between the coupled condition and the uncoupled condition.

4. The pipe machining apparatus of claim 1, wherein the arm includes a threaded portion and the engagement member is adapted to threadably move along the threaded portion of the arm.

5. The pipe machining apparatus of claim 1, wherein the first housing member defines a first recess therein to accommodate movement of the arm between the coupled condition and the uncoupled condition, and wherein the second housing member defines a second recess therein to accommodate movement of the arm between the coupled condition and the uncoupled condition.

6. The pipe machining apparatus of claim 1, wherein the coupling member is a first coupling member, the pipe machining apparatus further comprising a second coupling member cooperating with the first coupling member to couple the first section and the second section together, the second coupling member including
   a third housing member coupled to the first section,
   a fourth housing member coupled to the second section,
   a second arm movably coupled to the fourth housing member, and
   a second engagement member coupled to the second arm,
   wherein the second arm is adapted to move between a coupled condition, in which the second engagement member engages the third housing member, and an uncoupled condition, in which the second engagement member does not engage the third housing member.

7. The pipe machining apparatus of claim 6, wherein the third housing member is coupled to the first portion of the tool carrier on the first section and the fourth housing member is coupled to the second portion of the tool carrier on the second section.

8. The pipe machining apparatus of claim 6, wherein the fourth housing member includes a second projection and the third housing member includes a second receptacle adapted to receive the second projection therein.

9. The pipe machining apparatus of claim 1, wherein the first section and the second section are substantially semi-circular in shape.

10. The pipe machining apparatus of claim 1, wherein the first portion of the tool carrier includes a first mating surface and the second portion of the tool carrier includes a second mating surface adapted to engage the first mating surface with the first section and the second section coupled together, and wherein the projection of the first housing member extends beyond the first mating surface of the first portion of the tool carrier.

11. The pipe machining apparatus of claim 10, wherein the first housing member includes a first housing mating surface and the second housing member includes a second housing mating surface adapted to engage the first housing mating surface with the first section and the second section coupled together, and wherein the projection of the first housing member extends beyond the first housing mating surface of the first housing member.

12. The pipe machining apparatus of claim 1, wherein the first housing member includes a first housing mating surface and the second housing member includes a second housing mating surface adapted to engage the first housing mating surface with the first section and the second section coupled together, and wherein the projection of the first housing member extends beyond the first housing mating surface of the first housing member.

13. The pipe machining apparatus of claim 1, wherein the first portion of the tool carrier includes a first mating surface and the second portion of the tool carrier includes a second mating surface adapted to engage the first mating surface with the first section and the second section coupled together, and wherein the receptacle of the second housing member is recessed behind the second mating surface of the second portion of the tool carrier.

14. The pipe machining apparatus of claim 13, wherein the first housing member includes a first housing mating surface and the second housing member includes a second housing mating surface adapted to engage the first housing mating surface with the first section and the second section coupled together, and wherein the receptacle of the second housing member is recessed behind the second housing mating surface of the second housing member.

15. The pipe machining apparatus of claim 1, wherein the first housing member includes a first housing mating surface and the second housing member includes a second housing mating surface adapted to engage the first housing mating surface with the first section and the second section coupled together, and wherein the receptacle of the second housing member is recessed behind the second housing mating surface of the second housing member.

16. The pipe machining apparatus of claim 1, wherein the receptacle is at least partially defined by a surface of the tool carrier.

17. The pipe machining apparatus of claim 1, wherein the projection abuts a surface of the tool carrier.

18. The pipe machining apparatus of claim 1, wherein the arm moves in a plane, and wherein the projection is positioned between the plane and the tool carrier.

19. The pipe machining apparatus of claim 18, wherein the receptacle is positioned between the plane and the tool carrier.

20. The pipe machining apparatus of claim 1, wherein the first housing member is coupled to a surface of the tool carrier, and wherein the projection has a longitudinal extent substantially parallel to the surface of the tool carrier.

21. The pipe machining apparatus of claim 1, wherein the arcuate surface of the projection is one of a pair of spaced-apart arcuate surfaces.

22. A pipe machining apparatus comprising:
a first section including a first portion of a frame and a first portion of a tool carrier;
a second section including a second portion of the frame and a second portion of the tool carrier, wherein the first section and the second section are adapted to be coupled together around a pipe, and, with the first and second sections coupled together, the frame is fixed relative to the pipe and the tool carrier is adapted to move relative to the frame and the pipe; and
a coupling member adapted to couple the first section and the second section together, the coupling member including
a first housing member coupled to the first section and including a projection having a pair of spaced-apart arcuate surfaces,
a second housing member coupled to the second section and defining a receptacle adapted to receive the projection of the first housing member, wherein the second housing member includes an arcuate surface at least partially defining the receptacle,
an arm movably coupled to the first housing member, and
an engagement member coupled to the arm,
wherein the arm is adapted to move between a coupled condition, in which the engagement member engages the second housing member, and an uncoupled condition, in which the engagement member does not engage the second housing member;
wherein, during assembly of the first and second sections, the arcuate surfaces of the projection and the receptacle are adapted to engage each other with the first and second sections misaligned, allow the projection to insert into the receptacle with the first and second sections misaligned and to move the first and second sections into proper alignment for coupling together.

* * * * *